(12) United States Patent
Rusch-Ihwe et al.

(10) Patent No.: US 8,387,104 B2
(45) Date of Patent: Feb. 26, 2013

(54) METHOD AND A DEVICE FOR THE EFFICIENT TRANSMISSION OF PROGRAM AND SERVICE DATA FOR NATIONAL AND REGIONAL BROADCAST

(75) Inventors: Jens Rusch-Ihwe, Brandenburg an der Havel (DE); Norman Herzog, Berlin (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 214 days.

(21) Appl. No.: 12/890,929

(22) Filed: Sep. 27, 2010

(65) Prior Publication Data

US 2011/0099599 A1 Apr. 28, 2011

(30) Foreign Application Priority Data

Oct. 16, 2009 (DE) .......................... 10 2009 049 607
Dec. 8, 2009 (DE) .......................... 10 2009 057 363

(51) Int. Cl.
*H04N 7/173* (2011.01)
(52) U.S. Cl. ............... 725/117; 725/32; 725/33; 725/34; 725/35; 725/36; 725/67; 725/68; 725/69; 725/70; 725/71
(58) Field of Classification Search .................. None
See application file for complete search history.

(56) References Cited

U.S. PATENT DOCUMENTS

| | | | |
|---|---|---|---|
| 5,216,503 A | 6/1993 | Paik et al. | |
| 5,506,844 A | 4/1996 | Rao | |
| 5,614,914 A | 3/1997 | Bolgiano et al. | |
| 5,835,493 A | 11/1998 | Magee et al. | |
| 5,903,574 A | 5/1999 | Lyons | |
| 5,966,120 A * | 10/1999 | Arazi et al. | 715/724 |

(Continued)

FOREIGN PATENT DOCUMENTS

| DE | 199 60 295 A1 | 6/2001 |
|---|---|---|
| DE | 196 17 293 | 11/2001 |

(Continued)

OTHER PUBLICATIONS

ATSC Digital Television Standard (A/53), "Annex D: RF/Transmission Systems Characteristics", Sep. 16, 1995, pp. 46-60.

(Continued)

*Primary Examiner* — Nasser Goodarzi
*Assistant Examiner* — Paul Graham
(74) *Attorney, Agent, or Firm* — Fitzpatrick, Cella, Harper & Scinto (57) ABSTRACT

A method and a device for transmitting a transport stream according to a digital television-transmission standard for stationary and/or mobile receivers with program and service data for a national and a regional broadcast determines the transmission capacity in the transport stream provided in each case for the national and the regional broadcast through a first multiplexer within a centrally positioned headend. The first multiplexer then fills the transport stream with program and service data for national broadcast within the transmission capacity of the transport stream provided for the broadcast and marks the transmission capacity provided within the transport stream for the regional broadcast. Second multiplexers provided in the regional headends and/or in the regional transmitters in each case fill the marked transmission capacity of the transport stream, transmitted in each case from the central headend to several regionally positioned headends and/or regionally positioned transmitters, with program and service data for regional broadcast.

18 Claims, 7 Drawing Sheets

U.S. PATENT DOCUMENTS

| | | | |
|---|---|---|---|
| 6,005,605 A | 12/1999 | Kostreski et al. |
| 6,088,337 A | 7/2000 | Eastmond et al. |
| 6,130,898 A | 10/2000 | Kostreski et al. |
| 6,192,070 B1 | 2/2001 | Poon et al. |
| 6,269,092 B1 | 7/2001 | Schilling |
| 6,313,885 B1 | 11/2001 | Patel et al. |
| 6,324,186 B1 | 11/2001 | Mahn |
| 6,335,766 B1 | 1/2002 | Twitchell et al. |
| 6,414,720 B1 | 7/2002 | Tsukidate et al. |
| 6,477,180 B1 | 11/2002 | Aggarwal et al. |
| 6,480,236 B1 | 11/2002 | Limberg |
| 6,496,477 B1 | 12/2002 | Perkins et al. |
| 6,507,618 B1 | 1/2003 | Wee et al. |
| 6,631,491 B1 | 10/2003 | Shibutani et al. |
| 6,640,239 B1 | 10/2003 | Gidwani |
| 6,721,337 B1 | 4/2004 | Kroeger et al. |
| 6,727,847 B2 | 4/2004 | Rabinowitz et al. |
| 6,728,467 B2 | 4/2004 | Oshima |
| 6,772,434 B1 | 8/2004 | Godwin |
| 6,801,499 B1 | 10/2004 | Anandakumar et al. |
| 6,804,223 B2 | 10/2004 | Hoffmann et al. |
| 6,816,204 B2 | 11/2004 | Limberg |
| 6,861,964 B2 | 3/2005 | Breti et al. |
| 6,862,707 B2 | 3/2005 | Shin |
| 6,879,720 B2 | 4/2005 | Sarachik et al. |
| 6,930,983 B2 | 8/2005 | Perkins et al. |
| 6,934,312 B2 | 8/2005 | Takeuchi et al. |
| 6,996,133 B2 | 2/2006 | Bretl et al. |
| 7,110,048 B2 | 9/2006 | Weiss |
| 7,111,221 B2 | 9/2006 | Birru et al. |
| 7,197,685 B2 | 3/2007 | Limberg |
| 7,310,354 B2 | 12/2007 | Fimoff et al. |
| 7,324,545 B2 | 1/2008 | Chuah et al. |
| 7,336,646 B2 | 2/2008 | Muller |
| 7,349,675 B2 | 3/2008 | Karr et al. |
| 7,382,838 B2 | 6/2008 | Peting |
| 7,496,094 B2 | 2/2009 | Gopinath et al. |
| 7,532,677 B2 | 5/2009 | Simon |
| 7,532,857 B2 | 5/2009 | Simon |
| 7,539,247 B2 | 5/2009 | Choi et al. |
| 7,551,675 B2 | 6/2009 | Kroeger |
| 7,554,912 B2 | 6/2009 | Rodriguez-Sanchez et al. |
| 7,558,279 B2 | 7/2009 | Hwang et al. |
| 7,564,905 B2 | 7/2009 | Park et al. |
| 7,593,474 B2 | 9/2009 | Jeong et al. |
| 7,599,348 B2 | 10/2009 | Kang et al. |
| 7,667,780 B2 | 2/2010 | Weiss |
| 7,668,250 B2 | 2/2010 | Limberg |
| 7,672,399 B2 | 3/2010 | Simon |
| 7,702,337 B2 | 4/2010 | Vare et al. |
| 7,715,489 B2 | 5/2010 | Zeng |
| 7,715,491 B2 | 5/2010 | Yu et al. |
| 7,733,819 B2 | 6/2010 | Lee et al. |
| 7,738,582 B2 | 6/2010 | Simon |
| 7,773,684 B2 | 8/2010 | Jeong et al. |
| 7,779,327 B2 | 8/2010 | Lee et al. |
| 7,783,316 B1 | 8/2010 | Mitchell |
| 7,801,181 B2 | 9/2010 | Song et al. |
| 7,804,909 B2 | 9/2010 | Choi et al. |
| 7,822,134 B2 | 10/2010 | Kim et al. |
| 7,822,139 B2 | 10/2010 | Simon |
| 7,830,974 B2 | 11/2010 | Choi et al. |
| 7,852,961 B2 | 12/2010 | Chang et al. |
| 7,856,590 B2 | 12/2010 | Kim et al. |
| 7,890,047 B2 | 2/2011 | Kidd et al. |
| 7,933,351 B2 | 4/2011 | Kim et al. |
| 7,953,160 B2 | 5/2011 | Gordon et al. |
| 8,009,662 B2 | 8/2011 | Lee et al. |
| 2001/0017849 A1 | 8/2001 | Campanella et al. |
| 2002/0085548 A1 | 7/2002 | Ku et al. |
| 2002/0170060 A1* | 11/2002 | Lyman ............................ 725/73 |
| 2003/0053493 A1 | 3/2003 | Graham Mobley et al. |
| 2003/0099303 A1 | 5/2003 | Birru et al. |
| 2003/0100267 A1 | 5/2003 | Itoh et al. |
| 2003/0206596 A1 | 11/2003 | Carver et al. |
| 2005/0013249 A1 | 1/2005 | Kong et al. |
| 2005/0044475 A1 | 2/2005 | Yedidia et al. |
| 2005/0084023 A1 | 4/2005 | Bott et al. |
| 2005/0147186 A1 | 7/2005 | Funamoto et al. |
| 2005/0207416 A1 | 9/2005 | Rajkotia |
| 2005/0238100 A1 | 10/2005 | Hsiao et al. |
| 2005/0249301 A1 | 11/2005 | Jeong et al. |
| 2006/0050770 A1 | 3/2006 | Wallace et al. |
| 2006/0126556 A1 | 6/2006 | Jiang et al. |
| 2006/0211436 A1 | 9/2006 | Paila et al. |
| 2006/0245516 A1 | 11/2006 | Simon |
| 2007/0066272 A1 | 3/2007 | Vassiliou et al. |
| 2007/0091857 A1* | 4/2007 | Elstermann .................. 370/338 |
| 2007/0143810 A1 | 6/2007 | Yousef |
| 2007/0174880 A1 | 7/2007 | Fite et al. |
| 2007/0230460 A1 | 10/2007 | Jeong et al. |
| 2008/0056219 A1 | 3/2008 | Venkatachalam |
| 2008/0175148 A1 | 7/2008 | Todd et al. |
| 2008/0209464 A1* | 8/2008 | Wright-Riley .................. 725/25 |
| 2008/0211969 A1 | 9/2008 | Simon et al. |
| 2008/0247442 A1 | 10/2008 | Orlik et al. |
| 2008/0259835 A1 | 10/2008 | Venkatachalam et al. |
| 2008/0273698 A1 | 11/2008 | Manders et al. |
| 2009/0003432 A1 | 1/2009 | Liu et al. .................. 375/240.01 |
| 2009/0013356 A1 | 1/2009 | Doerr et al. |
| 2009/0016435 A1 | 1/2009 | Brandsma et al. |
| 2009/0034442 A1 | 2/2009 | Song et al. |
| 2009/0040962 A1* | 2/2009 | Oger et al. ...................... 370/316 |
| 2009/0100459 A1* | 4/2009 | Riedl et al. ........................ 725/35 |
| 2009/0193487 A1 | 7/2009 | Simon |
| 2009/0201997 A1 | 8/2009 | Kim et al. |
| 2009/0225872 A1 | 9/2009 | Simon |
| 2009/0228764 A1 | 9/2009 | Lee et al. |
| 2009/0228765 A1 | 9/2009 | Lee et al. |
| 2009/0252266 A1 | 10/2009 | Heinemann et al. |
| 2009/0265751 A1 | 10/2009 | Limberg |
| 2009/0293086 A1* | 11/2009 | Lutterbach et al. ............. 725/34 |
| 2010/0023972 A1* | 1/2010 | Summers et al. ............... 725/54 |
| 2010/0150182 A1 | 6/2010 | Noronha, Jr. |
| 2010/0254449 A1* | 10/2010 | Rusch-Ihwe ............. 375/240.02 |
| 2011/0004912 A1* | 1/2011 | Teniou et al. .................. 725/118 |
| 2011/0230202 A1* | 9/2011 | Wood et al. ................. 455/456.1 |

FOREIGN PATENT DOCUMENTS

| | | |
|---|---|---|
| DE | 101 12 773 A1 | 9/2002 |
| DE | 10 2006 015 393 | 10/2007 |
| DE | 10 2007 012 465 | 5/2008 |
| EP | 0 837 609 | 4/1998 |
| EP | 0 926 894 A1 | 6/1999 |
| EP | 1 079 631 A1 | 2/2001 |
| EP | 1 670 150 | 6/2006 |
| EP | 1 753 249 | 2/2007 |
| EP | 1 950 962 A1 | 7/2008 |
| EP | 1 965 389 A2 | 9/2008 |
| GB | 2 399 719 | 9/2004 |
| WO | WO 02/03728 | 1/2002 |
| WO | WO 03/009590 | 1/2003 |
| WO | WO 03/045064 | 5/2003 |
| WO | WO 2004/062283 | 7/2004 |
| WO | WO 2006/046107 | 5/2006 |
| WO | WO 2006/066617 | 6/2006 |
| WO | WO 2006/084361 | 8/2006 |
| WO | WO 2007/046672 | 4/2007 |
| WO | WO 2007/114653 | 10/2007 |
| WO | WO 2008/042694 | 4/2008 |
| WO | WO 2009/016175 | 2/2009 |
| WO | WO 2010/000407 | 1/2010 |

OTHER PUBLICATIONS

ATSC Digital Television Standard (A/53) Revision E, Advanced Television Systems Committee, Dec. 27, 2005.

ATSC Recommended Practice: Design of Synchronized Multiple Transmitter Networks (A/111), Advanced Television Systems Committee, Sep. 3, 2004.

ATSC Standard: Synchronization Standard for Distributed Transmission (A/110), Advanced Television Systems Committee, Jul. 14, 2004.

ATSC Standard: Synchronization Standard for Distributed Transmission, Revision A (A/110A), Advanced Television Systems Committee, Jul. 19, 2005.

ATSC Standard: Synchronization Standard for Distributed Transmission, Revision B (A/110B), Advanced Television Systems Committee (Dec. 24, 2007).

ATSC Technology Group Report: DTV Signal Reception and Processing Considerations, Doc. T3-600r4, Advanced Television Systems Committee, Sep. 18, 2003.

Battisa, "Spectrally Efficient High Data Rate Waveforms for the UFO SATCOM Channel", Military Communications Conference, MILCOM 98, Proceedings, Oct. 18-21, 1998, pp. 134-139, IEEE vol. 1.

Citta, R., et al., "ATSC Transmission System: VSB Tutorial", Zenith Electronics Corporation, Symposium Handout, Montreuz Symposium, Jun. 12, 1997.

"Digital Video Broadcasting (DVB); DVB Mega-Frame for Single Frequency Network (SFN) Synchronization", European Broadcasting Union; eTSI TS 101 191 v1.4.1, Jun. 2004.

"European Broadcasting Union Union Europeenne de Radio-Television Digital Video Broadcasting (DVB); Specification for Service Information (SI) in DVB systems; ETS 300 468", ETSI Standards, Lis, Sophia Antipolis Cedex, France, vol. BC, Second Edition, Jan. 1, 1997, pp. 1-72.

Lecture 4: Digital Television the DVB transport stream, obtained from http://www.abo.fi/~jbjorkqv/digitv/lect4.pdf (last visited May 4, 2006).

Lee, Y., et al., "ATSC Terrestrial Digital Television Broadcasting Using Single Frequency Networks", ETRI Journal, Apr. 2004, pp. 92-100, vol. 26, No. 2.

Owen, H., "Proposed Modifications to ATSC Digital Television Standard to Improve Performance in the Face of Dynamic Multipath for Both Fixed and Mobile Operation", Sarnoff Corporation, Apr. 2, 2001.

Patel, C. B., et al., "Proposal to ATSC Subcommittee T3/59 to Provide 8-VSB With a Repetitive-PN1023 Signal for Rapidly and Reliably Initializing Tracking in an Adaptive Equalizer Despite Adverse Multipath Conditions", Apr. 12, 2001.

Proposal for Enhancement of ATSC RF Transmission System (Revision to A/53), submitted by Samsung, Draft ver. 1.0, Sep. 16, 2004.

Raghunandan, K., "Satellite Digital Audio Radio Service (SDARS) System Architecture and Receiver Review", IEEE, Oct. 27, 2005.

Vogel, W. J., et al., "Propagation Effects and Satellite Radio Design", Paper No. 1445, Maastricht Exhibition and Congress Centre (MECC), Aug. 17-24, 2002.

Wang, "A New Implementation of Single Frequency Network Based on DMB-T", 2004 International Conference on Communications, Circuits and Systems (2004 ICCCAS), Jun. 27-29, 2004, pp. 246-249, vol. 1.

Wang, X., et al., "Transmitter Identification in Distributed Transmission Network and Its Applications in Position Location and a New Data Transmission Scheme", NAB Broadcast Engineering Conference, Apr. 16-21, 2005, pp. 511-520.

Whitaker, J. C., "Standard Handbook of Video and Television Engineering", Chapter 17.2 "ATSC DTV Received Systems", 2000, pp. 17-63 to 17-99.

"ATSC-Mobile DTV Standard, Part 3—Service Multiplex and Transport Subsystem Characteristics", Advanced Television Systems Committee, Inc., Document A/153 Part 3:2009, Oct. 15, 2009, pp. 14-25.

"Universal Mobile Telecommunication Systems (UMTS); Introduction of the Multimedia Broadcast/Multicast Service (MBMS) in the Radio Access Network (Ran); Stage 2" (3GPP TS 25.346 version 7.4.0 Release 7); ETSI TS 125 346 No. V7.4.0 (Jun. 2007), IEEE, Lis, Sophia Antipolis Cedex, France, vol. 3-R2, No. V7.4.0, Jun. 1, 2007.

* cited by examiner

METHOD AND A DEVICE FOR THE EFFICIENT TRANSMISSION OF PROGRAM AND SERVICE DATA FOR NATIONAL AND REGIONAL BROADCAST

CROSS-REFERENCE TO RELATED APPLICATIONS

The present application claims prioity to German Applications DE 10 2009 049 607.6 filed on Oct. 16, 2009 and DE 10 2009 057 363.1 filed on Dec. 8, 2009.

BACKGROUND OF THE INVENTION

The invention relates to a method and a device for the efficient transmission of program and service data for national and regional broadcast.

In geographically large countries such as the USA, national programs for a nationwide broadcast and regional programs for a regional broadcast are combined simultaneously in a single transport stream of a digital television transmission.

Figure 1:
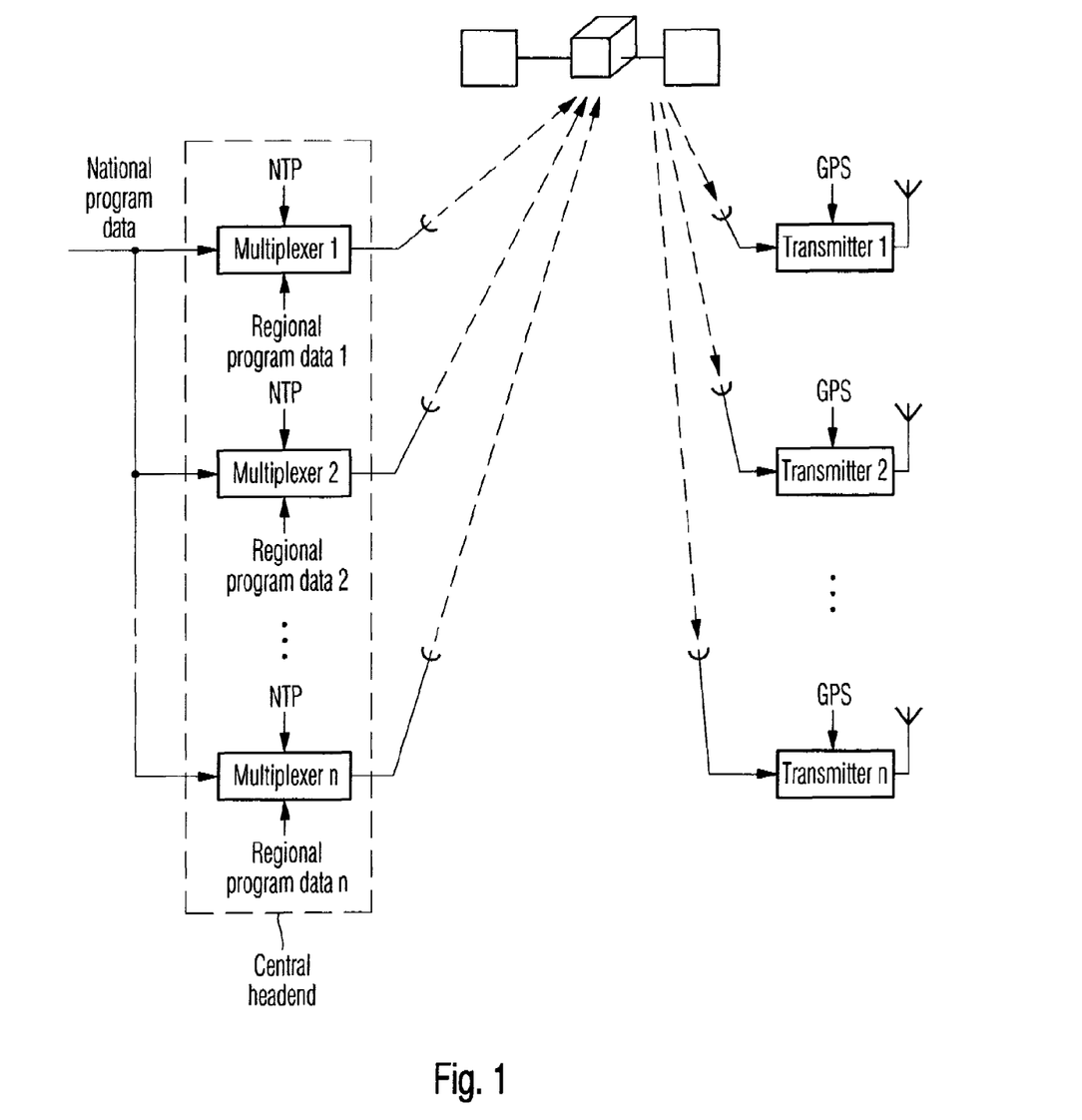
FIG. 1 shows a block circuit diagram of a device for transmitting a transport stream with program and service data for a national and a regional broadcast.

As shown in FIG. 1, TV program and service data determined for regional and national broadcast have conventionally been generated centrally or de-centrally as individual MPEG2 transport streams, supplied to the central headend (distribution head) in each case via a data link, and each combined within the central headend into one transport stream for each region. Accordingly, for example, for digital TV transmission in the USA, under the Advanced Television Systems Committee Standard (ATSC Standard), the identical national program content for all regions is combined in each case in an ATSC multiplexer with the respectively different regional program content for each region to form a transport stream broadcast in the respective region. The transport streams associated with the individual regions are typically transmitted from the central headend via one or more satellite-supported STL data link to the individual, regionally distributed transmitters.

The data transmission from the central headend to the individual transmitters demands an unnecessarily large transmission bandwidth, since the program and service data determined for national broadcast are transmitted from the central headend to the individual transmitters several times corresponding to the number of transport streams. Moreover, program and service data determined for mobile receivers are unnecessarily already coded in the central headend, although a complex coding implemented additionally for program and service data to mobile receivers is required only on the transmission path from the regional transmitters to the mobile receivers. This represents a waste of necessary transmission data rate in an ATSC-M/H Advanced-Television Systems Committee-Mobile/Handheld) transmission system for mobile and stationary receivers by comparison with an ATSC transmission system for stationary receivers, in which a coding of this kind has not hitherto been implemented. In the least favourable case, 83.1% of the required transmission data rate for coding is wasted in this context.

Regarding the prior art, reference is made to DE 199 60 295 A1. It is known from DE 199 60 295 A1 that marked data packets can be extracted from the datastream for different regional programs through their PID.

SUMMARY OF THE INVENTION

The object of the invention is therefore to realise a method and a device for data transmission between a centrally positioned headend and regionally positioned transmitters with which the necessary transmission data rate can be significantly reduced.

The object of the invention is achieved by a method for transmitting a transport stream with program and service data for a national and a regional broadcast with the features of claim 1 and by a corresponding device for transmitting a transport stream with program and service data for a national and a regional broadcast with the features of claim 18. Advantageous technical developments are specified in the dependent claims.

According to the invention, a number of transport streams corresponding to the number of regional broadcasting areas, each of which contains the national program and service data and the regional program and service data associated with the respective regional broadcasting area, is no longer generated as was previously conventional and transmitted to the regional broadcasting areas; instead a single transport stream is generated which contains only the national program and service data and transmission capacity for the regional program and service data, and this is transmitted to the individual regional broadcasting areas. The program and service data for regional broadcast in the respective regional broadcasting areas are only inserted into the transmission capacity of the received transport stream pre-reserved for the regional program and service data in the regional broadcasting area. In this manner, the required transmission data rate for the data transmission from the central headend to the regional broadcasting areas is reduced by a factor corresponding to the number of regional broadcasting areas.

Since not only program and service data for stationary receivers,—preferably TV program and service data for stationary receivers—but also program and service data for mobile receivers—preferably TV program data for mobile receivers—which require a data structuring within the transport stream with marginal timing conditions, are transmitted from the central headend to the regional broadcasting areas within an ATSC-M/H transmission system, the structuring of the transport stream with regard to a time allocation of the entire available transmission capacity of the transport stream to the transmission capacity required by the program and service data for stationary receivers and to the transmission capacity required by the program and service data for mobile receivers is already implemented in the central headend.

Figure 2:
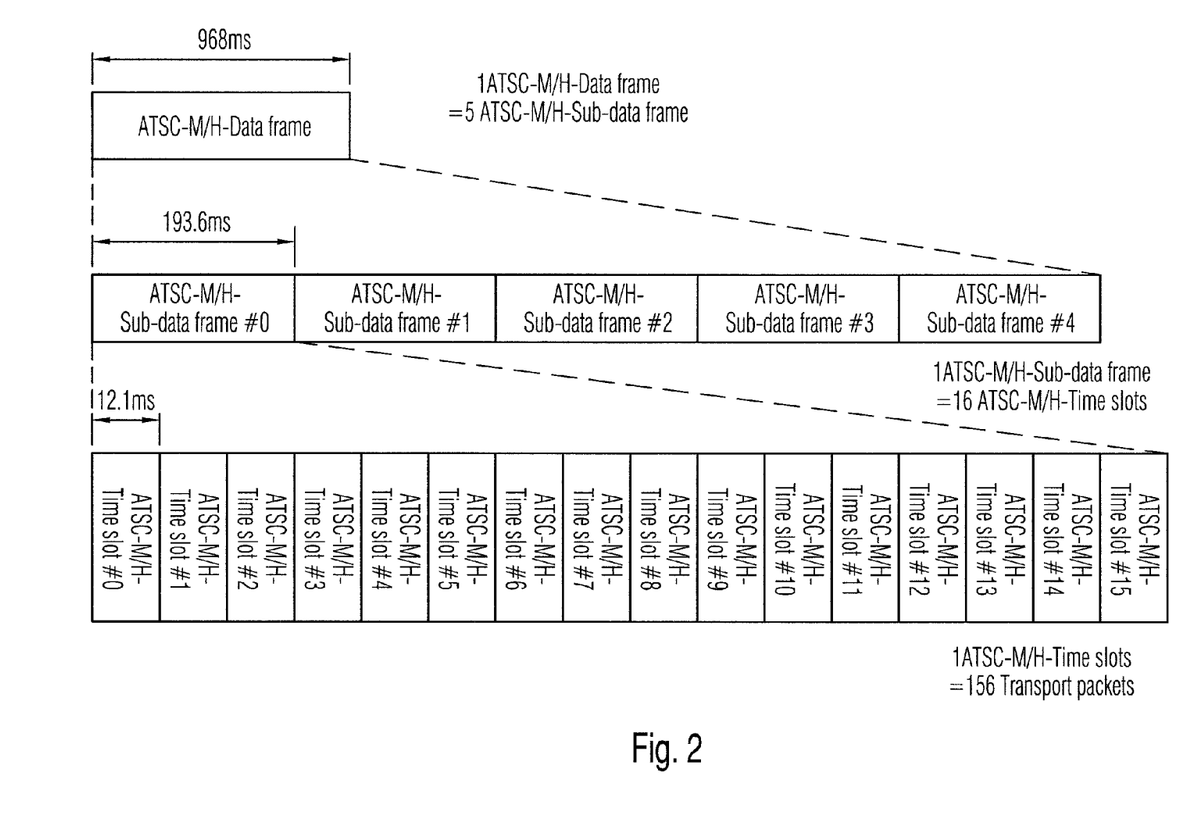
FIG. 2 shows a data structure of a transport stream according to the ATSC-M/H standard.

According to the US American Advanced Television Systems Committee-Mobile/Handheld standard, the transport stream, which, alongside program and service data for stationary receivers, also contains program and service data for mobile receivers, provides a regular data structure as shown in FIG. 2, which comprises ATSC-M/H data frames (ATSC-M/H data frames), ATSC-M/H sub-frames (ATSC-M/H sub-frames), ATSC-M/H time slots (ATSC-M/H slots) and transport packets. This regular data structure of the transport stream is filled with the program and service data for mobile receivers and the program and service data for stationary receivers. In this context, the 156 transport packets of one ATSC-M/H timeslot are defined by program and service data for stationary receivers. As an alternative, 118 continuous transport packets of an ATSC-M/H timeslot can be defined by program and service data of an ATSC-M/H group (ATSC-M/H group) for mobile receivers and 38 transport packets of the ATSC-M/H timeslot by program and service data for stationary receivers.

On the basis of this data structuring according to the ATSC-M/H standard, the transport packets provided for the transmission of program data for national broadcast and the transport packets provided for the transmission of program and service data for regional broadcast are determined by a first multiplexer of the central headend. The program and service data for stationary and mobile receivers are filled into the transport packets of the transport stream determined for the national broadcast by the first multiplexer according to the data structuring specifications of the ATSC-M/H standard.

In a first embodiment of the invention, the transport packets determined for the regional broadcast are defined by the first multiplexer with null transport packets.

In a second embodiment of the invention, a further reduction of the transmission data rate of the data transmission between the central headend and the regional broadcasting areas is achieved in that no null transport packets are transmitted as pre-reserved transmission capacity for program and service data for regional broadcast, but instead an information, which marks the number of successive null transport packets, is stored in the transport stream by the first multiplexer. In a first sub-variant of the second embodiment of the invention, this marking information is stored at the beginning of the transport packets provided in the transport stream for the regional broadcast. In a second sub-variant of the second embodiment of the invention, this marking information is deposited within the signalisation data of the ATSC-M/H transport stream, in which, inter alia, the ATSC-M/H data frames, ATSC-M/H sub-data frames, ATSC-M/H time slots and transport packets used for mobile receivers are stored within the transport stream - within the so-called ATSC-M/H framing -, and is typically stored in the first two transport packets of an ATSC-M/H data frame defined with program and service data for mobile receivers. Alongside the deposited number of transport packets, which are provided for program and service data for regional broadcast, in a second sub-variant of the second embodiment of the invention, this marking information also contains information regarding the time sequence of these transport packets planned for program and service data for regional broadcast within the ATSC-M/H transport stream.

A second multiplexer, which receives the transport stream transmitted from the central headend and inserts the program and service data provided for the regional broadcast into the transmission capacity provided for the regional broadcast, that is to say, into the transport packets provided for the regional broadcast, is located in each individual regional broadcasting area, either within a regional headend or in a regional transmission station. In this context, the transmission capacity provided by the central headend in the transport stream for the regional broadcast can be used by the second multiplexer entirely for the broadcast of regional TV programs in the respective regional broadcasting area. As an alternative, the respective second multiplexer can fill up only a part of the transmission capacity pre-planned for the regional broadcast in the transport stream with program and service data for regional broadcast, while the unused transmission capacity is provided with null transport packets in order to maintain the consistency of the data structure within the ATSC-M/H transport stream. Finally, the second multiplexer in the respective regional broadcasting area can replace a part of or all of the programs to be broadcast nationally with program and service data for regional broadcast.

Since the second multiplexer in the respective regional broadcasting area has a free access to the signalisation data of the ATSC-M/H transport stream, it is possible, within the framework of the specifications of the ATSC-M/H standard, for the respective second multiplexer to subdivide the transmission capacity provided within the ATSC-M/H transport stream for the regional broadcast arbitrarily among program and service data for stationary receivers and program and service data for mobile receivers. This possibility within the framework of the specifications of the ATSC-M/H standard for arbitrary distribution of the transmission capacity between program and service data for stationary receivers and program and service data for mobile receivers applies in an equivalent manner for the transmission capacity within the ATSC-M/H transport stream which was originally filled with program and service data for national broadcast and is replaced by the respective second multiplexer with program and service data for regional broadcast.

In a first development of the invention, in each respective regional broadcasting area, a second multiplexer is integrated into the individual transmitter associated with the respective regional broadcasting area. This second multiplexer inserts given program and service data into the received ATSC-M/H transport stream in each case for regional broadcast within the regional broadcasting area.

In a second development of the invention, in each respective regional broadcasting area, a second multiplexer is integrated in a regional headend. This second multiplexer inserts given program and service data into the received ATSC-M/H transport stream for regional broadcast within the regional broadcasting area and thereby transmits the accordingly "regionalised" ATSC-M/H transport stream to the individual transmitters of the regional broadcasting area, which all broadcast the same ATSC-M/H transport stream within a shared-channel network after time synchronisation of the transmitters associated with the regional broadcasting area.

In a third development of the invention, by way of equivalence with the first development of the invention, a single second multiplexer, which is integrated in each case within a transmitter, is provided in every regional broadcasting area. In this context, several respective second multiplexers insert program and service data for regional broadcast into the received ATSC-M/H transport stream in an identical manner. Accordingly, several transmitters, each allocated to a different regional broadcasting area, broadcast an ATSC-M/H transport stream with identical program contents and accordingly form a shared-channel network after time synchronisation of the respective transmitter.

In order to save additional transmission bandwidth in the data transmission between the central headend and the individual regional broadcasting areas, the program and service data determined for mobile receivers and for national broadcast are channel-coded only in the regional broadcasting area. By contrast with a transmission of channel-coded program and service data, the non-channel-coded program and service data inserted by the multiplexer of the central headend into the ATSC-M/H transport stream require fewer ATSC-M/H transport packets.

In a first variant, the ATSC-M/H transport packets not required are not transmitted. An information deposited in the signalisation data of the ATSC-M/H transport stream or at the beginning of the non-transmitted portion of the ATSC-M/H transport stream indicates to the second multiplexers in the individual regional broadcasting areas the number of saved and non-transmitted ATSC-M/H transport packets, which are to be inserted by the individual second multiplexers in order to replace the non-channel-coded program and service data with corresponding channel-coded program and service data in the ATSC-M/H transport stream in the corresponding sequence.

In a second variant, the ATSC-M/H transport packets not required are used for the transmission of program and service data for regional broadcast, which are generated either centrally or de-centrally and supplied to the central headend for transmission to the respective regional broadcasting area, for example, via an STL datalink.

BRIEF DESCRIPTION OF THE DRAWINGS

The individual embodiments, developments, variants and sub-variants of the method according to the invention and of the device according to the invention for transmitting a transport stream with program and service data for a national and a regional broadcast are explained in greater detail below by way of example with reference to the drawings. The drawings are as follows.

DETAILED DESCRIPTION OF THE EXEMPLARY EMBODIMENTS OF THE INVENTION

In the following section, the method according to the invention for transmitting a transport stream with program and service data for a national and a regional broadcast is explained in detail on the basis of the flow diagram in FIG. 7 in conjunction with the three developments of the device according to the invention for transmitting a transport stream with program and service data for a national and a regional broadcast on the basis of the block circuit diagrams in FIGS. 3, 4 and 5.

Figure 7:
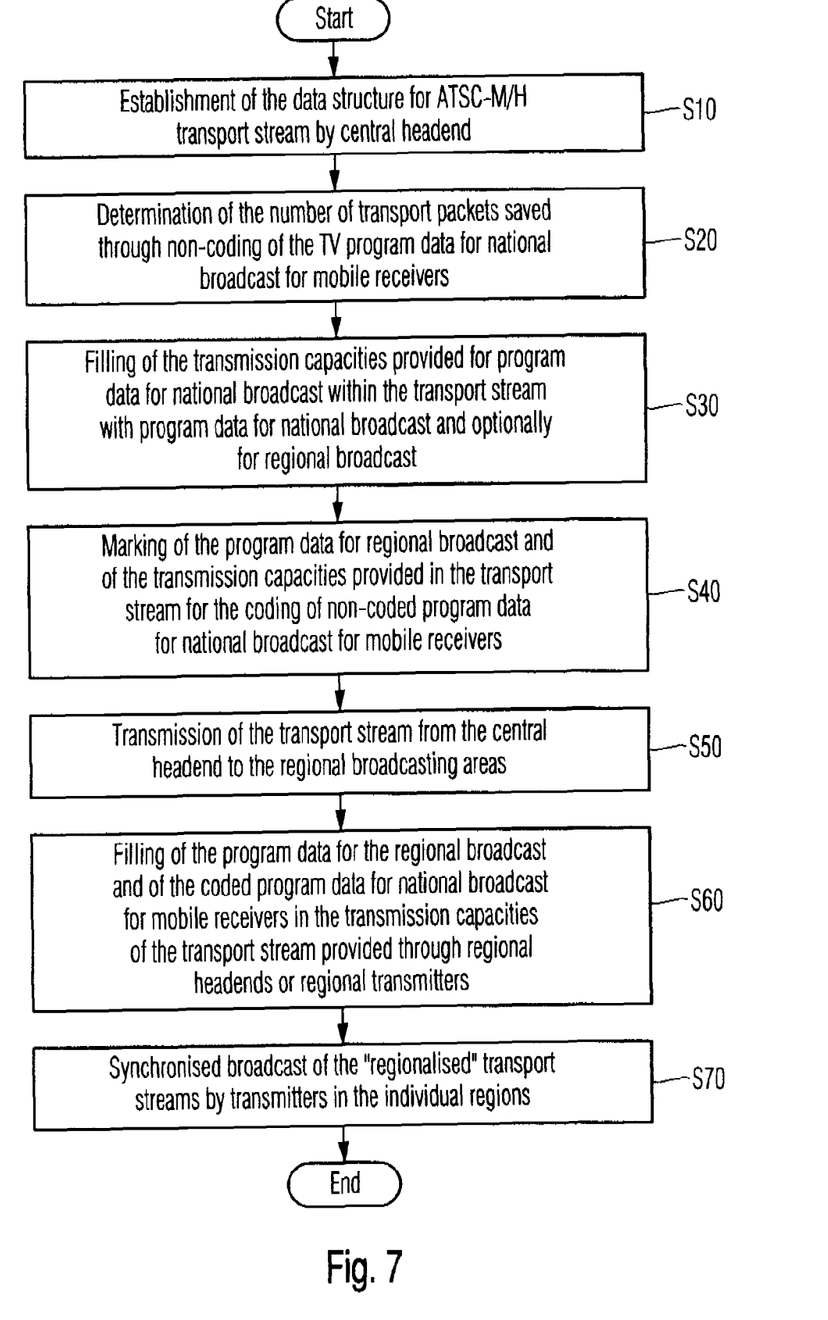
FIG. 7 shows a flow diagram of a method according to the invention for transmitting a transport stream with program and service data for a national and a regional broadcast.

In the first method step S10 in FIG. 7, a generation of an ATSC-M/H transport stream, a synchronisation of the generated ATSC-M/H transport stream with a reference clock, preferably with the Global Positioning System (GPS) clock, a planning of the transmission capacities within the generated ATSC-M/H transport stream are implemented in a first multiplexer 1, which is disposed in a central headend 2. Alongside this, within the first method step S10, reference clocks are inserted into the generated timestamp, which is used for synchronising the transmission timing points of the individual ATSC-M/H transport packets to be transmitted within the ATSC-M/H transport stream in the individual exciters $7_1, 7_2, 7_n$ or $7_{11}, \ldots, 7_{1n}, 7_{21}, \ldots, 7_{2n}, 7_{n1}, \ldots, 7_{nn}$ of the individual transmitters $4_1, 4_2, \ldots, 4_n$ or $4_{11}, \ldots, 4_{1n}, 4_{21}, \ldots, 4_{2n}, 4_{n1}, \ldots, 4_{nn}$.

Within the framework of this application, headend is understood to mean a distribution head, which receives and distributes incoming program and service data centrally and bundles outgoing program and service data centrally.

In planning the transmission capacities within the ATSC-M/H transport stream, a distinction must be made, on the one hand, regarding program and service data for stationary receivers and program and service data for mobile receivers and, on the other hand, regarding program and service data for national broadcast and program and service data for regional broadcast.

The allocation of the transmission capacity of the ATSC-M/H transport stream to the individual types of program and service data is not implemented in capacity units of arbitrary size, but is based on specified capacity units of a data structure standardised for the ATSC-M/H transport stream. This data structure of the ATSC-M/H transport stream results from the fact that, because of the limited energy resources of mobile receivers, program and service data for mobile receivers are transmitted in bursts with a given burst duration and within a given burst cycle, and accordingly in data units with a given transmission capacity and in a given data rate within the ATSC-M/H transport stream. The data structure of the ATSC-M/H transport stream corresponding to the ATSC-M/H standard with the data units ATSC-M/H data frame, ATSC-M/H sub-data frame, ATSC-M/H timeslot and ATSC-M/H transport packet, is illustrated in FIG. 2. This data structure of the ATSC-M/H transport stream is filled not only with program and service data for mobile receivers, but also with program and service data for stationary receivers.

Corresponding to the transmission demand for program and service data for stationary and mobile receivers on the one hand and for national and regional broadcast on the other hand, the individual data units of the ATSC-M/H transport stream, namely ATSC-M/H data frame, ATSC-M/H sub-data frame, ATSC-M/H timeslot and ATSC-M/H transport packet, are subdivided in the first step by the first multiplexer 1 into program and service data for national and regional broadcast and, in the second step, within this subdivision, into program and service data for mobile and stationary receivers.

In the next method step S20, the number of ATSC-M/H transport packets, which can be saved through the non-channel-coded transmission of the program and service data for national broadcast for mobile receivers by comparison with a channel-coded transmission on the transmission path between the central headend 2 and the regional headends $3_1, 3_2, \ldots, 3_n$ or the regional transmitters $4_1, 4_2, \ldots, 4_n$ is determined for the program and service data for national broadcast for mobile receivers, which require an additional complex coding for the transmission on the transmission path between the regional transmitters and the mobile receivers. Typically, a saving of transmission capacity between 61.4% and 83.1% can be realised with a non-channel-coded transmission by comparison with a channel-coded transmission.

In the next method step S30, the program and service data provided for the national broadcast are inserted by the first multiplexer into the transmission capacities of the ATSC-M/H transport stream provided for program and service data for national broadcast, in particular, into the ATSC-M/H transport packets of the ATSC-M/H transport stream provided for the transmission of program and service data for national broadcast. These program and service data for national broadcast can be generated in situ in the central headend 2 or at any arbitrary other place. While the program and service data for national broadcast for stationary receivers are typically supplied via a serial, digital data link (for example, with an Asynchronous Serial Interface (ASI) datalink) to the first multiplexer 1 of the central headend 2, the program and service data for national broadcast for mobile receivers are typically supplied via an Internet-based datalink.

Figure 6:
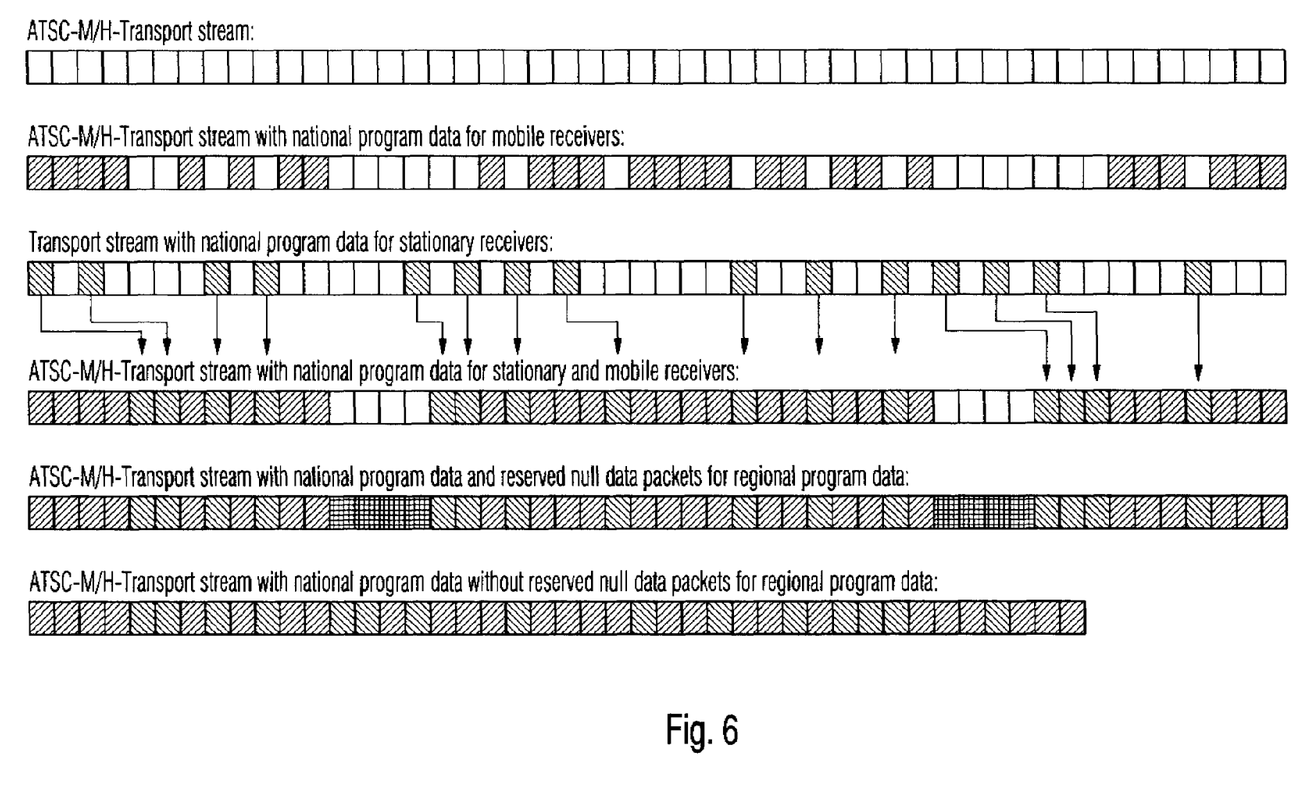
FIG. 6 shows a data structure of an ATSC-M/H transport stream generated and transmitted according to the invention.

Within the ATSC-M/H transport stream, of which the data structure is presented schematically in the first line of FIG. 6, the program and service data for national broadcast for mobile receivers are initially inserted into the transmission capacities pre-reserved for program and service data for national broadcast within the ATSC-M/H transport stream according to the second line in FIG. 6. Following this, the program and service data for national broadcast for stationary receivers are inserted by the first multiplexer 1 into the transmission capacities within the ATSC-M/H transport stream pre-reserved for program and service data for national broadcast, taking into account a time displacement relative to the original transport stream defined with program and service data for national broadcast for stationary receivers (see third line by comparison with fourth line in FIG. 6), which may be required, but is technically acceptable.

Since the program and service data for national broadcast for mobile receivers are transmitted in a non-channel-coded manner on the transmission path between the central headend 2 and the regional headends $3_1, 3_2, \ldots, 3_n$ or the regional transmitters $4_1, 4_2, \ldots, 4_n$, a given number of ATSC-M/H transport packets which have been pre-reserved for the transmission of program and service data for national broadcast for mobile receivers on the transmission path between the central headend 2 and the regional headends $3_1, 3_2, \ldots, 3_n$ or the regional transmitters $4_1, 4_2, \ldots, 4_n$ remains unused and is defined, in a second variant of the invention, with program and service data for regional broadcast. These program and service data for regional broadcast are program and service data which are generated centrally or de-centrally and supplied to the first multiplexer 1 of the central headend 2 via a cable-bound or satellite-supported STL datalink (studio transmitter link) provided on the Internet-Protocol basis (IP basis). If program and service data for regional broadcast for mobile receivers, which are filled into the transport packets of the ATSC-M/H transport stream not used by the non-channel-coded program and service data for national broadcast for mobile receivers are involved, these are transmitted in an equivalent, non-channel-coded manner.

In the next method step S40, the transmission capacities in the ATSC-M/H transport stream provided for program and service data for regional broadcast are marked.

In a first embodiment of the invention, a number of null transport packets which corresponds to the transmission capacity provided for the transmission of program and service data for regional broadcast is inserted for this purpose at the positions within the ATSC-M/H transport stream provided for the transmission of program and service data for regional broadcast according to the fifth line in FIG. 6.

In a second embodiment of the invention, the null transport packets which represent a reservation for the program and service data for regional broadcast in the ATSC-M/H transport stream are saved according to the sixth line in FIG. 6. Instead, an information which marks the number of transport packets, which have been determined in method step S10 by the first multiplexer 1 for the transmission of program and service data for regional broadcast, and their position within the ATSC-M/H transport stream, is stored by the first multiplexer 1 within the ATSC-M/H transport stream. On the basis of this marking information, as will be explained in greater detail below, the program and service data for regional broadcast in the individual regional broadcasting areas can be inserted at the correct positions within the ATSC-M/H transport stream, in order to generate in this manner a regionalised ATSC-M/H transport stream in situ within the individual regional broadcasting areas.

In a first sub-variant of the second embodiment of the invention, this marking information is inserted by the first multiplexer 1 at the beginning of the transmission portion in the ATSC-M/H transport stream in which the program and service data for regional broadcast are inserted. Since, in the first sub-variant of the second embodiment of the invention, the position of the program and service data for regional broadcast within the ATSC-M/H transport stream is automatically determined with the position of the marking information within the ATSC-M/H transport stream, the marking information contains only an indication of the number of ATSC-M/H transport packets to be inserted at this position in the ATSC-M/H transport stream and provided for the transmission of program and service data for regional broadcast.

In a second sub-variant of the second embodiment of the invention, the marking information is stored as signalisation data of the ATSC-M/H transport stream. Since the signalisation data for program and service data for national and regional broadcast should advantageously be stored in a bundled manner within the ATSC-M/H transport stream, the signalisation data for the program and service data for regional broadcast are stored with the signalisation data for the program and service data for national broadcast for mobile receivers, which, inter alia, indicate the ATSC-M/H sub-data frame, the ATSC-M/H timeslots and the ATSC-M/H transport packets within an ATSC-M/H data frame in which program and service data for mobile receivers are transmitted. These signalisation data for program and service data for national broadcast for mobile receivers are typically stored in the first two ATSC-M/H transport packets of an ATSC-M/H timeslot. Since the position of the individual signalisation data within the ATSC-M/H transport stream does not reflect the position of the transmission range within the ATSC-M/H transport stream in which program and service data for regional broadcast should be inserted the marking information stored in the signalisation data must also contain, alongside an indication of the number of ATSC-M/H transport packets provided for the transmission of program and service data for regional broadcast, an indication regarding the position of the ATSC-M/H transport packets provided for the transmission of program and service data for regional broadcast within the ATSC-M/H transport stream.

By way of equivalence with the second embodiment of the invention, in a first variant of the invention, the ATSC transport packets saved through the non-coded transmission of the program and service data for national broadcast for mobile receivers are not transmitted. Accordingly, in method step S40, in a first sub-variant of the first of variant of the invention, an information, which marks the number of ATSC transport packets to be inserted, is stored at the start of the transmission portion of the ATSC-M/H transport stream, in which, in the regional headends $3_1, 3_2, \ldots, 3_n$ or in the regional transmitters $4_1, 4_2, \ldots, 4_n$, additional ATSC-M/H transport packets are inserted into the ATSC-M/H transport stream for the transmission of coded program and service data for national or regional broadcast for mobile receivers. In a second sub-variant of the first variant of the invention, this marking information is stored in the signalisation data of the program and service data for national or regional broadcast for mobile receivers. Additionally, in both sub-variants of the first variant of the invention, coding parameters, for example, the coding method to be used, for the coding in the regional headends $3_1, 3_2, \ldots, 3_n$ or in the regional transmitters $4_1, 4_2, \ldots, 4_n$ is deposited in the signalisation data of the program and service data for national or regional broadcast for mobile receivers.

In the next method step S50, the ATSC-M/H transport stream is transmitted by the central headend 2 via a satellite 5 to the individual regional broadcasting areas and received there either by the regional headends $3_1, 3_2, \ldots, 3_n$ or the regional transmitters $4_1, 4_2, \ldots, 4_n$. The datalink is realised in a serial and digital manner and is typically based on the Asynchronous Serial Interface (ASI) standard or the Society of Motion Picture and Television Engineers (SMPTE) 310M standard.

In the next method step S60, a filling of the transmission capacities of the ATSC-M/H transport stream provided for program and service data for regional broadcast with program and service data for regional broadcast is implemented in the second multiplexers $6_1, 6_2, \ldots, 6_n$ associated with the respective regional headends $3_1, 3_2, \ldots, 3_n$ or respective regional transmitters $4_1, 4_2, \ldots, 4_n$. These program and service data for regional broadcast can be generated regionally in situ or at any arbitrary other place and supplied to the second multiplexer $6_1, 6_2, \ldots, 6_n$ of the respective regional headends $3_1, 3_2, \ldots, 3_n$ or the respective regional transmitters $4_1, 4_2, \ldots, 4_n$ typically via an IP-based datalink.

Important for the filling of the transmission capacities of the ATSC-M/H transport stream by the second multiplexers $6_1, 6_2, \ldots, 6_n$ of the regional headends $3_1, 3_2, \ldots, 3_n$ and the regional transmitters $4_1, 4_2, \ldots, 4_n$ is the fact that the data structure and timing of the ATSC-M/H transport stream generated by the first multiplexer 1 of the central headend 2 remains preserved, that is to say, no ATSC-M/H transport packets are removed from the ATSC-M/H transport stream and/or no additional ATSC-M/H transport packets are inserted into the ATSC-M/H transport stream. Moreover, a change of the data rate of the ATSC-M/H transport stream by inserting additional empty ATSC-M/H transport packets—so-called stuffing transport packets—is therefore also not allowed. Accordingly, the data rate of the ATSC-M/H transport stream before the saving of transmission capacity for the transmission of non-channel-coded ATSC-M/H transport packets in the first multiplexer 1 of the central headend 2 corresponds to the data rate of the ATSC-M/H transport stream at the output of the second multiplexers $6_1, 6_2, \ldots, 6_n$ of the regional headends $3_1, 3_2, \ldots, 3_n$ and the regional transmitters $4_1, 4_2, \ldots, 4_n$, and a transparent transport path from the first multiplexer 1 of the central headend 2 to the second multiplexers $6_1, 6_2, \ldots, 6_n$ of the regional headends $3_1, 3_2, \ldots, 3_n$ and the regional transmitters $4_1, 4_2, \ldots, 4_n$ is present.

Figure 3:
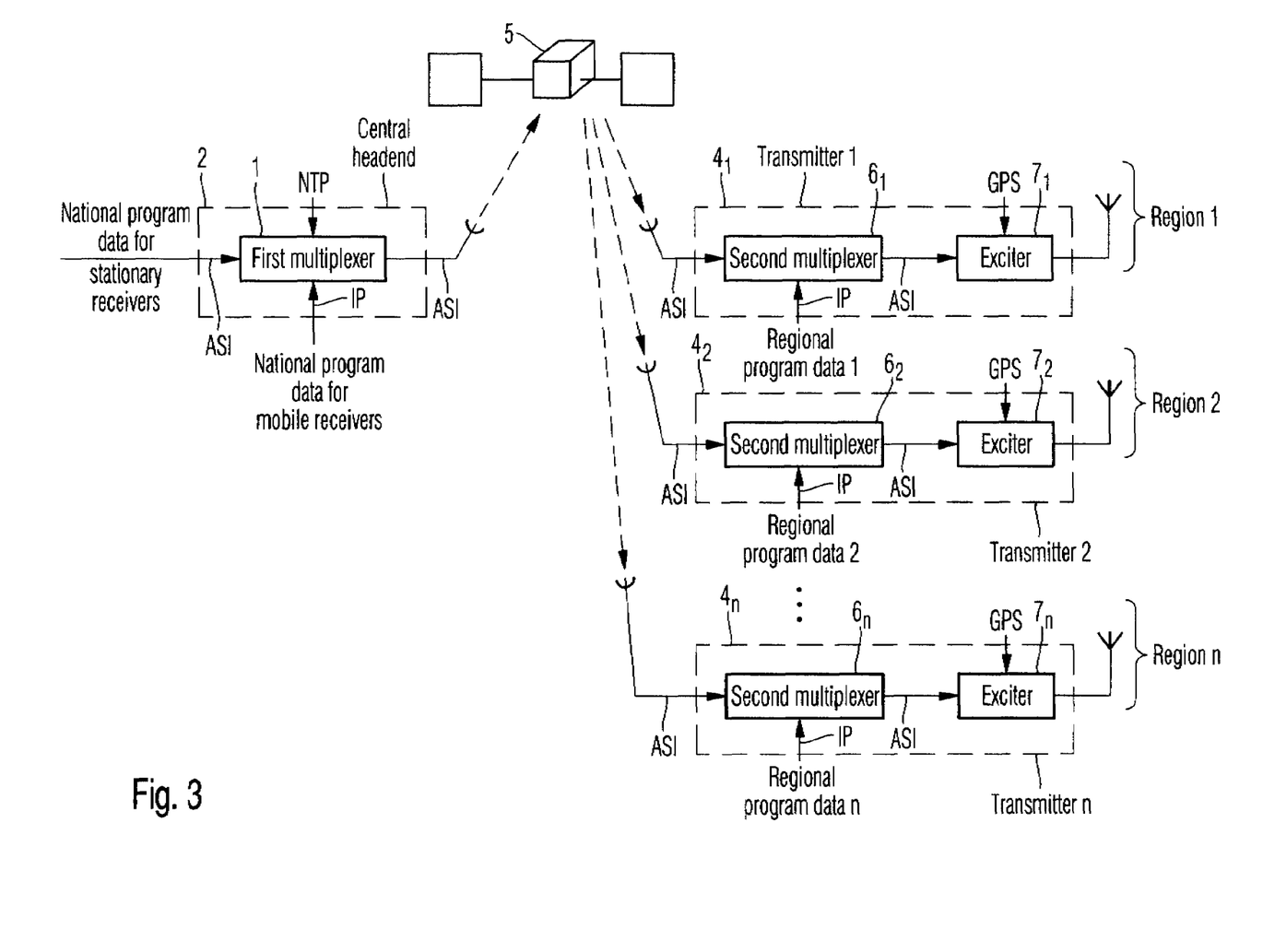
FIG. 3 shows a first development of the device according to the invention for transmitting a transport stream with program and service data for a national and a regional broadcast.

In a first development of the invention according to FIG. 3, in the second multiplexers $6_1, 6_2, \ldots, 6_n$ of the transmitters $4_1, 4_2, \ldots, 4_n$ associated in each case with the individual regions $1, 2, \ldots, n$, in each case region-specific program and service data are inserted at the positions provided in the ATSC-M/H transport stream for the transmission of program and service data for regional broadcast. Accordingly, each individual transmitter $4_1, 4_2, \ldots, 4_n$ covers an independent regional broadcasting area as a single transmission station within the respective regional broadcasting area. Through the synchronisation of the individual transmitters $4_1, 4_2, \ldots, 4_n$ explained in greater detail below, a handover is possible between the individual regional broadcasting areas in the case of the program and service data for national broadcast inserted in an identical manner by the respective regional transmitters $4_1, 4_2, \ldots, 4_n$ in the associated ATSC-M/H transport stream. A handover between the individual regional broadcasting areas in the case of the program and service data for regional broadcast is not possible because of the different region-specific program contents.

Figure 4:
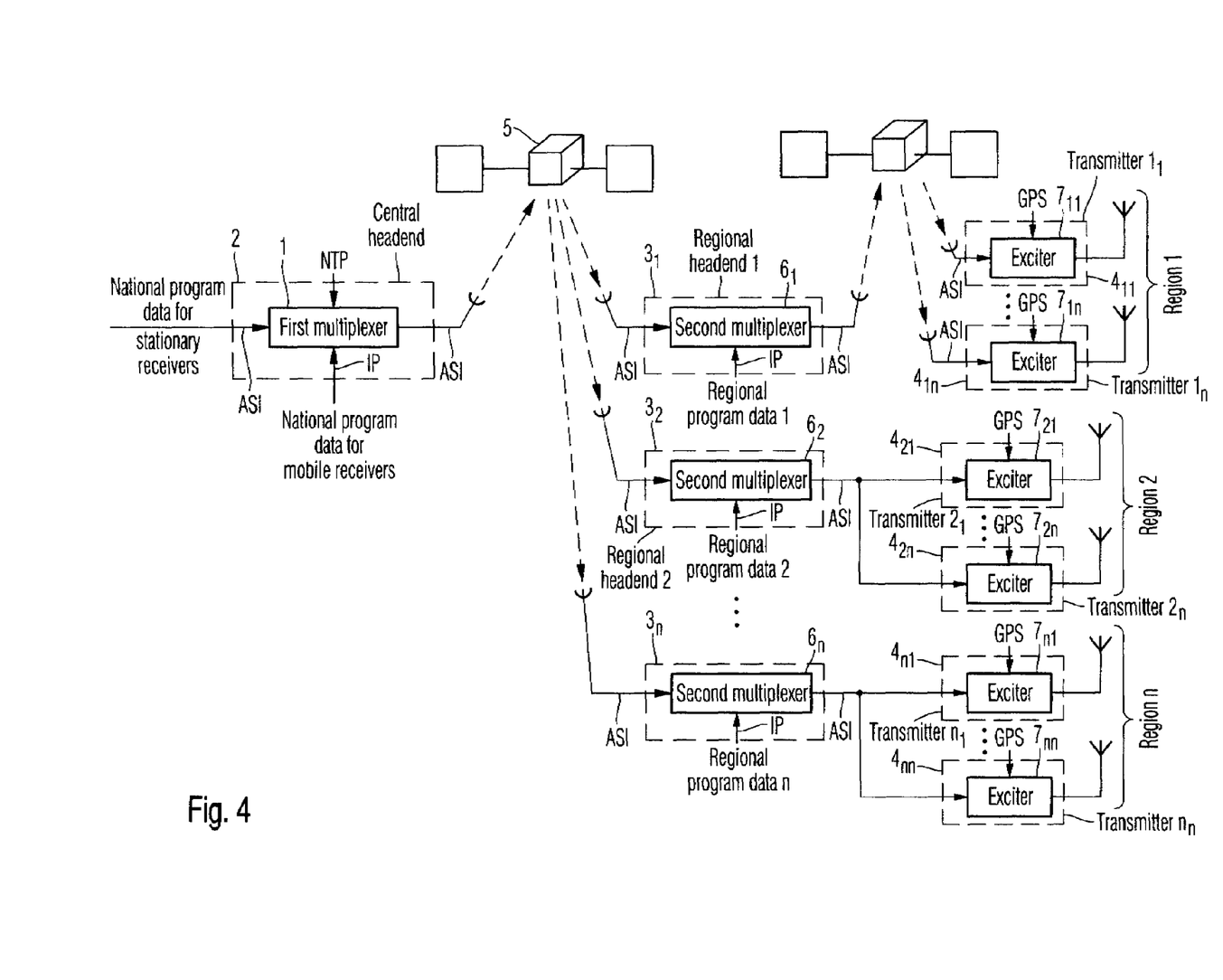
FIG. 4 shows a second development of the device according to the invention for transmitting a transport stream with program and service data for a national and a regional broadcast.

In a second development of the invention according to FIG. 4, region-specific program and service data are inserted by the second multiplexers $6_1, 6_2, \ldots, 6_n$ of the respective regional headends $3_1, 3_2, \ldots, 3_n$ into the respective ATSC-M/H transport stream. The individual regional headends $3_1, 3_2, \ldots, 3_n$ transmit the accordingly "regionalised" ATSC-M/H transport stream in each case to several transmitters $4_{11}, \ldots, 4_{1n}, 4_{21}, \ldots, 4_{2n}$ and $4_{n1}, \ldots, 4_{nn}$ associated in each case with a regional broadcasting area. The transmitters $4_{11}, 4_{1n}, 4_{21}, \ldots, 4_{2n}$ and $4_{n1}, \ldots, 4_{nn}$ associated in each case with a regional broadcasting area each contain an identical ATSC-M/H transport stream with regard to the program and service data for national and regional broadcast and, after a further synchronisation of the associated exciters $7_{11}, \ldots, 7_{1n}$ or $7_{21}, \ldots, 7_{2n}$ or $7_{n1}, \ldots, 7_{nn}$ to be explained in greater detail below, form a shared-frequency network. A handover is possible within the individual regional broadcasting areas with the program and service data for national and regional broadcast.

The data transmission between the individual regional headends $3_1, 3_2, \ldots, 3_n$ and the individual transmitters $4_1, 4_2, \ldots, 4_n$ of the respective regional broadcasting area is implemented, as shown in FIG. 4 for the broadcasting area 1, via a satellite-supported datalink or, as shown in FIG. 4 for the broadcasting areas 2 and n, via cable-bound datalink, which is realised in both cases in a serial and digital manner, for example, corresponding to the ASI standard.

Figure 5:
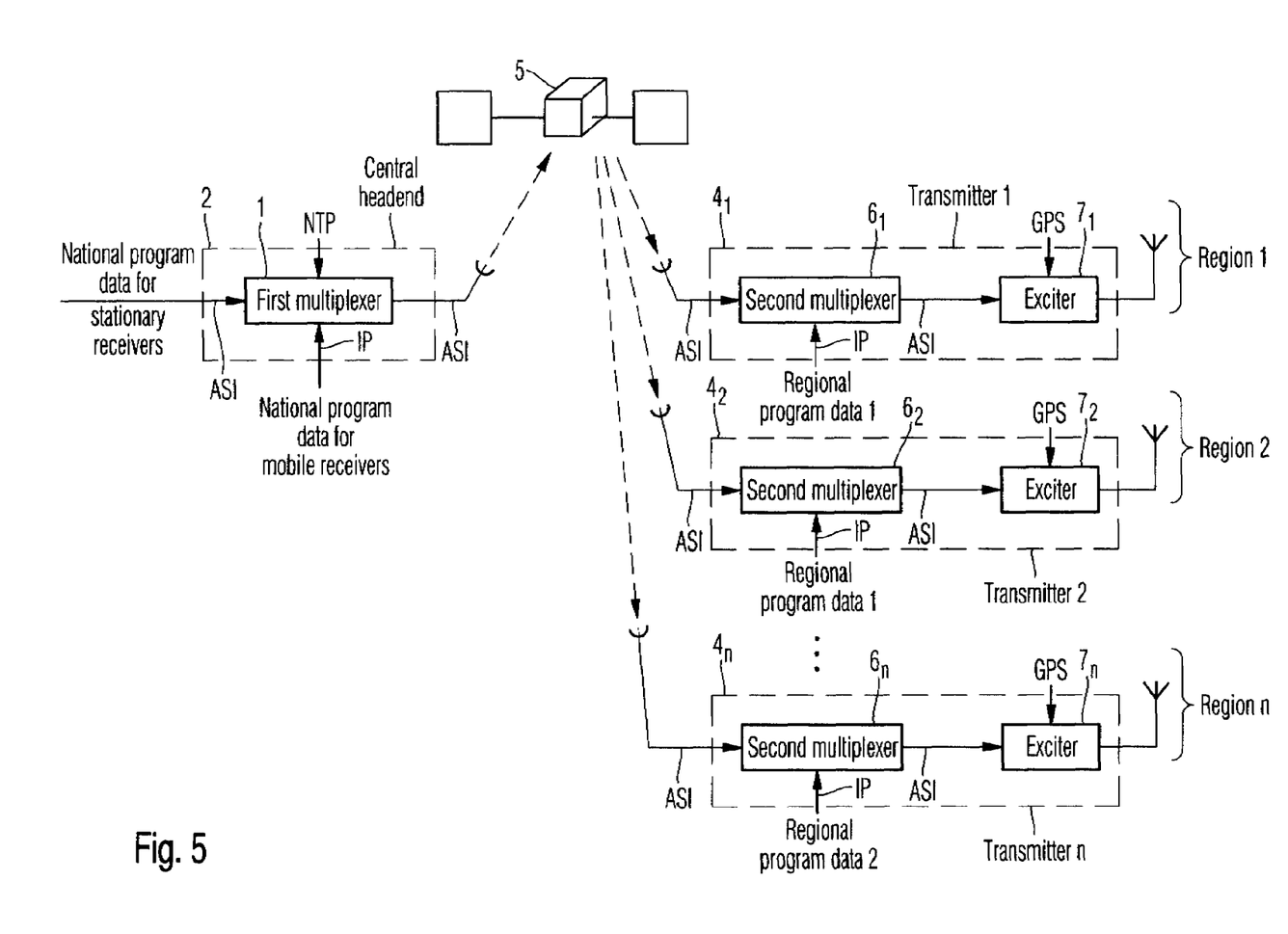
FIG. 5 shows a third development of the device according to the invention for transmitting a transport stream with program and service data for a national and a regional broadcast.

In a third development of the invention according to FIG. 5, the second multiplexers $6_1, 6_2, \ldots, 6_n$ insert into the transmission capacities of the ATSC-M/H transport stream provided for the transmission of program and service data for regional broadcast respectively identical program and service data for regional broadcast from several transmitters $4_1, 4_2, \ldots, 4_n$ each associated with one regional broadcasting area, - in the example of FIG. 5, the second multiplexers $6_1$ and $6_2$ of the transmitters $4_1$ and $4_2$, so that, after a synchronisation of the respective ATSC-M/H transport streams in the individual exciters $7_1, 7_2, \ldots, 7_n$ to be explained in greater detail below, the transmitters stationed in the associated regional broadcasting areas represent a shared-frequency network with regard to the program and service data to be broadcast nationally and at the same time with regard to the program and service data to be broadcast regionally. A handover, that is to say, a transfer from broadcasting area to broadcasting area, is possible between the individual regional broadcasting areas connected together to form a shared-frequency network—in the example of FIG. 5, between the broadcasting areas 1 and 2—with the program and service data for national and regional broadcast.

As an alternative, in the third development of the invention, the second multiplexers $6_1, 6_2, \ldots, 6_n$ can insert into the received ATSC-M/H transport stream respectively no program and service data for regional broadcast from several transmitters $4_1, 4_2, \ldots, 4_n$ associated in each case with a regional broadcasting area. In this case also, after a synchronisation, of the respective ATSC-M/H transport streams in the individual exciters $7_1, 7_2, \ldots, 7_n$ (controlled transmitters) to be explained in greater detail below, the associated transmitters $4_1, 4_2, \ldots, 4_n$ represent a shared-frequency network with regard to the program and service data for national broadcast. A handover between the individual regional broadcasting areas combined to form a shared-frequency network is possible only in the case of program and service data for national broadcast.

In the third embodiment of the invention, the second multiplexers $6_1, 6_2, \ldots, 6_n$, in which identical program and service data for regional broadcast are inserted into the respectively received ATSC-M/H transport stream, can be implemented in regional headends $3_1, 3_2, \ldots, 3_n$ instead of regional transmitters $4_1, 4_2, \ldots, 4_n$.

In the final method step S70, the regionalised ATSC-M/H transport streams are broadcast in a synchronised manner from the exciters $7_1, 7_2, \ldots, 7_n$ associated respectively with the region-specific transmitters $4_1, 4_2, \ldots, 4_n$, in the case of the first and third development of the invention, and from the exciters $7_{11}, \ldots, 7_{1n}$ or $7_{21}, \ldots, 7_{2n}$ or $7_{n1}, \ldots, 7_{nn}$ associated with the region-specific transmitters $4_{11}, \ldots, 4_{1n}, 4_{21}, \ldots, 4_{2}n$ and $4_{n1}, \ldots, 4_{nn}$ in the case of the second development of the invention. For this purpose, identical ATSC transport packets in the individual region-specific ATSC transport streams are provided by the first multiplexer 1 of the central headend 2 with an identical timestamp through reception of the Internet-based Network-Time-Protocol-Time (NTP-time) and based on the Global-Positioning System time (GPS-time). Through reception of the identical time reference, namely of the GPS time, in the individual exciters $7_1, 7_2, \ldots, 7_n$ or respectively $7_{11}, \ldots, 7_{1n}$ or $7_{21}, \ldots, 7_{2n}$ or $7_{n1}, \ldots, 7_{nn}$, identical ATSC-M/H transport packets are synchronised with one another in the individual region-specific ATSC-M/H transport streams.

The invention is not restricted to the embodiments, developments, variants and sub-variants presented. Alongside the ATSC-M/H standard, other standards for the transmission of digital program and service data for stationary and mobile receivers are also covered by the invention.

The invention claimed is:

1. A method for transmitting a transport stream according to a digital television-transmission standard, for stationary and/or mobile receivers with program and service data for a national and a regional broadcast with the following method steps:
    determining the transmission capacity in the transport stream provided respectively for the national and the regional broadcast through a first multiplexer in a centrally positioned headend;
    filling the transport stream with program and service data for national broadcast to the transmission capacity of the transport stream provided for the broadcast through the first multiplexer;
    marking the transmission capacity in the transport stream provided for the regional broadcast through the first multiplexer and
    filling the marked transmission capacity of the transport stream transmitted in each case from the central headend to several regionally positioned headends and/or regionally positioned transmitters with program and service data for regional broadcast through a second multiplexer provided in each of the regional headends and/or regional transmitters.

2. The method according to claim 1,
    wherein the transmission capacity within the transport stream marked for regional broadcast is filled with null transport packets.

3. The method according to claim 1,
    wherein the transmission capacity within the transport stream marked for regional broadcast is determined through a marking information in the transport stream.

4. The method according to claim 3,
    wherein the marking information is contained in the signalisation data of the transport stream and contains the number of transport packets provided for program and service data for regional broadcast and the time sequence of the transport packets provided for program and service data for regional broadcast within the transport stream.

5. The method according to claim 3,
    wherein the marking information is stored at the beginning of the transmission capacity provided in each case for the program and service data for regional broadcast and contains the number of transport packets provided for program and service data for regional broadcast.

6. The method according to claim 3,
    wherein the transmission capacity marked for program and service data for regional broadcast is filled up with null transport packets by the respective second multiplexer.

7. The method according to claim 2,
    wherein the null transport packets provided for program and service data for regional broadcast are entirely filled in each case with program and service data of one or more programs by the respective second multiplexer.

8. The method according to claim 2,
    wherein a part of the null transport packets provided for program and service data for regional broadcast is filled with program and service data provided for the regional broadcast of one or more programs or services, and the other part of the null transport packets provided for program and service data for regional broadcast remain as null transport packets.

9. The method according to claim 1,
    wherein program and service data for national broadcast in the respectively established transmission capacities of the transport stream are replaced partially or entirely with program and service data for regional broadcast in the respective second multiplexer.

10. The method according to claim 1,
    wherein the second multiplexers of each regionally positioned transmitter in each case insert different program and service data for regional broadcast into the received transport stream, and each regional transmitter broadcasts a transport stream with different program and service data for regional broadcast.

11. The method according to claim 1,
    wherein the second multiplexers in each case insert different program and service data for regional broadcast into the received transport stream, and the regional transmitters allocated to the second multiplexers in each case directly or indirectly via the respective regional headend form a shared-channel network and broadcast a transport stream with identical regional program and service data.

12. The method according to any one of claims 1 to 9, wherein several second multiplexers in each case insert identical program and service data for regional broadcast or no program and service data for regional broadcast into the received transport stream, and the regional transmitters allocated in each case to several second multiplexers form a shared-channel network and in each case broadcast a transport stream with identical regional program and service data.

13. The method according to claim 1,
    wherein the un-coded program and service data for national broadcast for mobile receivers are transmitted from the central headend to the regional headends and/or regional transmitters and are coded in the respective second multiplexer according to the transmitted coding parameters.

14. The method according to claim 13,
    wherein those transport packets which are provided for program and service data for national broadcast for mobile receivers and are not required by the un-coded program and service data for national broadcast for mobile receivers are not transmitted from the central headend to the regional headends and/or regional transmitters.

15. The method according to claim 14,
wherein the number of transport packets not transmitted because of lack of coding and the coding parameters is indicated through an information stored in the transport stream at the position of the non-transmitted transport packets or an information stored in the signalisation data to the respective second multiplexers, which insert the number of additional transport packets into the transport stream required for the coding of the un-coded program and service data for national broadcast for mobile receivers.

16. The method according to claim 13,
wherein those transport packets which are provided for program and service data for national broadcast for mobile receivers and are not required by the un-coded program and service data for national broadcast for mobile receivers are used for the transmission of program and service data for regional broadcast from the central headend to the regional headends and/or regional transmitters.

17. The method according to claim 4,
wherein the signalisation data for program and service data for national and regional broadcast are combined and/or stored in the first two transport packets of the transmission capacity provided for program and service data for mobile receivers in the transport stream.

18. A device for generating a transport stream according to a digital television-transmission standard, for stationary and/or mobile receivers with program and service data for a national and regional broadcast with a first multiplexer in a centrally positioned headend for determining transmission capacity in each case for program and service data for national and regional broadcast within a transport stream, in order to fill the transmission capacity provided for national broadcast with program and service data for national broadcast and to mark the transmission capacity provided for regional broadcast and, in each case a second multiplexer in several regionally positioned headends and/or regionally positioned transmitters for filling the transmission capacities provided for regional broadcast respectively with program and service data for regional broadcast.

* * * * *

UNITED STATES PATENT AND TRADEMARK OFFICE
CERTIFICATE OF CORRECTION

PATENT NO. : 8,387,104 B2
APPLICATION NO. : 12/890929
DATED : February 26, 2013
INVENTOR(S) : Jens Rusch-Ihwe et al.

It is certified that error appears in the above-identified patent and that said Letters Patent is hereby corrected as shown below:

ON THE TITLE PAGE, ITEM [56] REFERENCES CITED

Other Publications
    "Subcommittee T3/59" should read --Subcommittee T3/S9--.

ON THE TITLE PAGE, ITEM [56] REFERENCES CITED

"Nasser Goodarzi" should read --Nassar Moazzami--.

ON THE TITLE PAGE, ITEM [30] FOREIGN APPLICATION PRIORITY DATA

"10 2009 049 604" should read --10 2009 049 607.6--; and
    "10 2009 057 363" should read --10 2009 057 363.1--.

IN THE SPECIFICATION

COLUMN 2

Line 32, "receivers,-" should read --receivers- --.

COLUMN 3

Line 28, "framing -," should read --framing- --.

COLUMN 5

Line 60, "$7_2$," should read --$7_2$, ...,--.
    Line 61, "$7_{11}$,...," should read --$7_{11}$, ...,--.

Signed and Sealed this
Twenty-sixth Day of November, 2013

Margaret A. Focarino
*Commissioner for Patents of the United States Patent and Trademark Office*

CERTIFICATE OF CORRECTION (continued)
U.S. Pat. No. 8,387,104 B2

COLUMN 6

Line 18, "within the" should read --within the ATSC- --.
Line 19, "¶ ATSC-M/H" should read --ATSC-M/H--.

COLUMN 8

Line 49, "first of variant" should read --first variant--.

COLUMN 10

Line 8, "$4_{11}$," should read --$4_{11}$, ...,--.
Line 35, "and $4_2$," should read --and $4_2$- --.

COLUMN 11

Line 18, "$7_1$, $^7{}_2$, ..., $7_n$" should read --$7_1$, $7_2$, ..., 7n--.

IN THE CLAIMS

COLUMN 11

Line 44, "multiplexer and" should read --multiplexer; and--.